(12) United States Patent
Kubek

(10) Patent No.: US 9,399,220 B2
(45) Date of Patent: Jul. 26, 2016

(54) RETAINER FOR SAMPLE CARRIERS OF DIFFERENT SHAPES AND SIZES

(71) Applicant: Leica Microsystems CMS GmbH, Wetzlar (DE)

(72) Inventor: Martin Kubek, Driedorf (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 498 days.

(21) Appl. No.: 13/852,123

(22) Filed: Mar. 28, 2013

(65) Prior Publication Data

US 2013/0259773 A1  Oct. 3, 2013

(30) Foreign Application Priority Data

Mar. 29, 2012 (DE) .................. 10 2012 205 170

(51) Int. Cl.
*B01L 9/00* (2006.01)
*G02B 21/26* (2006.01)
*G02B 21/34* (2006.01)

(52) U.S. Cl.
CPC . *B01L 9/52* (2013.01); *G02B 21/26* (2013.01); *G02B 21/34* (2013.01)

(58) Field of Classification Search
CPC .... B01L 9/52; B01L 2300/0822; G02B 21/26
USPC ................................................. 422/560, 563
See application file for complete search history.

(56) References Cited

U.S. PATENT DOCUMENTS

| 699,059 A | 4/1902 | Archer |
|---|---|---|
| 4,436,385 A | 3/1984 | Fischer |
| 2005/0128575 A1 | 6/2005 | Bonaventura et al. |

FOREIGN PATENT DOCUMENTS

| DE | 7232969 U | 3/1973 |
|---|---|---|
| DE | 202007010161 U1 | 1/2008 |
| JP | 9-318506 A | 12/1997 |
| JP | 11-202213 A | 7/1999 |
| JP | 2002-139462 A | 5/2002 |

*Primary Examiner* — Jill Warden
*Assistant Examiner* — Dwayne K Handy
(74) *Attorney, Agent, or Firm* — Hodgson Russ LLP

(57) ABSTRACT

The disclosure relates to a retainer (100) for sample carriers (P1-P4) of different shapes and sizes. The retainer includes a retaining plane (110) for receiving the sample carrier; at least three respectively movably mounted stop elements (120), each of the stop elements (120) having at least one stop surface (121) which is embodied to be adjusted, by movement of the stop element (120), against the sample carrier (P1-P4); at least three securing elements (125), a securing element (125) being associated with each of the at least three stop elements (120); each of the at least three securing elements (125) configured to secure the associated stop element (120) immovably on the retainer, and configured to be conveyable into a first position in which the associated stop element (120) is movable, and to be conveyable into a second position in which the associated stop element is secured immovably on the retainer.

18 Claims, 4 Drawing Sheets

RETAINER FOR SAMPLE CARRIERS OF DIFFERENT SHAPES AND SIZES

CROSS REFERENCE TO RELATED APPLICATIONS

This application claims priority of German patent application number 10 2012 205 170.8 filed Mar. 29, 2012, the entire disclosure of which is incorporated by reference herein.

FIELD OF THE DISCLOSURE

The present disclosure relates to a retainer for sample carriers of different shapes and sizes, for a microscope.

BACKGROUND

Microscopes are often used to view samples that are carried by sample carriers of different shapes and sizes, for example microtiter plates, Petri dishes, or microscope specimen carriers (usually small glass plates). A retainer for a sample carrier is used, for example, with so-called scanning stages in order to ensure a defined position of the sample carrier on the microscope stage. If the sample carriers used are very different, the retainer must be exchanged; this results in laborious refitting work on the microscope, and is to be avoided.

A specimen carrier retainer for Petri dishes of different sizes, and a rectangular specimen carrier of one size, is known from JP 11-202213 A. Suitability for other sample carrier shapes and sizes is not provided.

It is desirable to make available a retainer that is suitable for as many sample carriers as possible of different shapes and/or sizes, so that a sample carrier change can be carried out without a change of retainer.

SUMMARY

The disclosure relates to a retainer for sample carriers for a microscope, with which retainer sample carriers of different shapes and sizes can be held or retained. Switching between different specimens and sample carriers becomes simplified. This encompasses specimens and sample carriers having different dimensions, outer edges, and shapes, e.g. slides or mulltititer plates, round Petri dishes, round sample holders (such as, for example, cans), or samples or sample holders having any number of sides. It is not necessary to exchange the retainer, and refitting work is avoided. The retainer also possesses at least three movable stop elements that define stop surfaces for the respectively held sample carrier. By corresponding movement or displacement, a region delimited by the stop elements can be adapted to the dimensions and to the contour or shape of the specimen or of the sample carrier. It is thus possible, by corresponding movement of the movable stop elements, to create secure retention of the respective sample carrier. The at least three movable stop elements permit a defined arrangement of the sample carrier relative to the retainer, and thus relative to the optical axis of a microscope. A stop element can preferably be mounted rotatably or slidably, and thereby be movable.

The invention may have particular advantages especially in combination with high-resolution microscopes, in particular those that operate with a scanning technology, such as e.g. confocal microscopes, in which drifting of the observed sample during image generation is problematic, and/or having displaceable X/Y stages, for example including motorized scanning stages, so as to ensure a defined position of the sample on the stage.

The retainer possesses a securing element for each of the at least three stop elements. A securing element is conveyable into different positions, and is embodied so that it can secure the associated stop element immovably on the retainer. More precisely, a securing element is conveyable into a first position in which the associated stop element is movable, and into another, second position in which the associated stop element is secured immovably on the retainer. Prior to securing, the stop element can be conveyed into any position and orientation. "Immovable" means that the stop element withstands the loads occurring in normal operation (e.g. X/Y displacement of a microscope stage, but also manual contact with or rotation of the stop element) without moving. The securing element is for that purpose preferably connected to the retainer via a screw connection, which can be loosened in order to make the stop element associated with it movable, and which can be tightened in order to secure the stop element associated with it. Once achieved, a precise orientation of a retained sample holder can thus be sustainably stabilized in simple fashion.

The securing element, in particular a screw or a threaded bolt, preferably simultaneously constitutes a rotation axis for a rotatably mounted stop element or a guide for a slidably mounted stop element.

The at least three movable stop elements are preferably arranged so that they form the corners of a polygon corresponding to the number of movable stop elements. According to an advantageous embodiment, exactly three movable stop elements are present, which form the corners of a triangle, preferably an isosceles triangle or an equilateral triangle. In equally advantageous fashion, four movable stop elements are present which form the corners of a rectangle. Simple orientation of a sample carrier at the center point of the rectangle, in the region of which point the observation beam path preferably extends, can thus occur.

For positioning of the retained sample carrier in the Z direction, i.e. perpendicular to a support plane (X/Y plane), spacing elements such as, for example, plates or rings can be inserted beneath the sample carrier to be retained. The retainer preferably comprises at least one cutout into which the spacing elements can be placed, so that the positioning of the spacing elements relative to the retainer is unequivocally defined. This allows for the use of spacing elements of different heights so that sample carriers of different heights can be oriented in the same Z position. Thus, the respective specimens on different sample carriers are arranged in the focus plane and refocusing of the microscope is not necessary.

Additional spring elements can also ensure retention in the Z direction, for example by the fact that the retained sample carrier is pressed onto the retainer (or the spacing element) in the Z direction by means of a spring element.

Further advantages and embodiments of the invention are evident from the description and from the attached drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and will be described in detail below with reference to the drawings.

DETAILED DESCRIPTION

Figure 1:
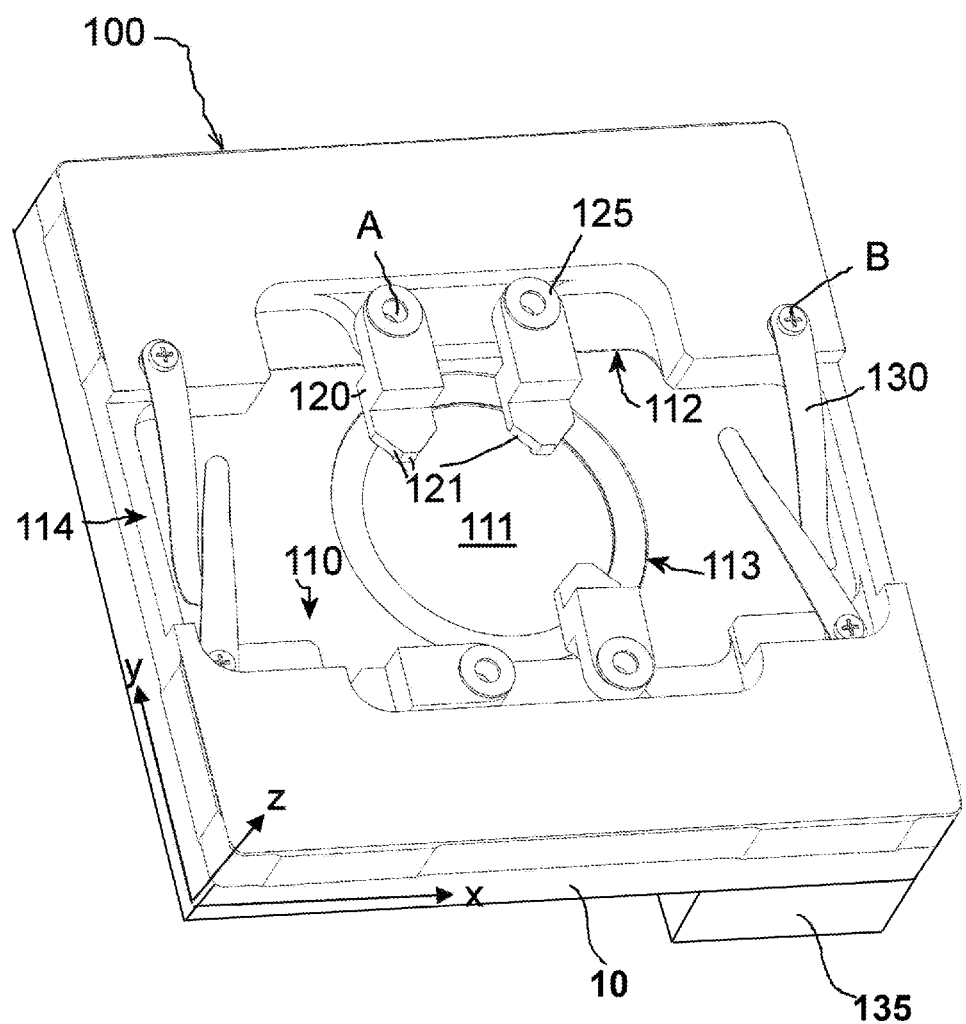
FIG. 1 is a perspective view of an embodiment of a sample carrier retainer according to an aspect of the present invention, wherein the sample carrier retainer is shown on a movable stage of a microscope.

In FIG. 1, an embodiment of a sample carrier retainer is depicted in a perspective view and labeled 100. The retainer is embodied here for a microscope stage 10 as an inserted part that is placed into a correspondingly shaped recess in the microscope stage, in particular a scanning stage, or as an overlaid part that is placed onto the microscope stage 10 as illustrated in FIG. 1. Retainer 100 is suitable in particular for microscope stages of ultrahigh-resolution microscopes such as, for example, confocal microscopes, in which what is desired is orientation of the sample carrier and thus of the sample relative to the microscope stage in as fixed (i.e. drift-free) a manner as possible over time. As indicated by arrows in FIG. 1, stage 10 and retainer 100 are displaceable in at least the X and Y directions in motorized fashion by a motor 135.

Retainer 100 possesses a recess 110 into which sample carriers of different shapes and sizes can be inserted. Recess 110 defines a retaining plane for receiving the sample carrier to be retained. Recess 110 possesses a central opening 111 that enables, in particular, transmitted light illumination of transparent samples in or on transparent sample carriers. Opening 111 is embodied around the center point of stop elements 120.

Retainer 100 here possesses four stop elements 120, each mounted rotatably around a rotation axis A (in this case, perpendicular to the retaining plane). In the embodiment depicted, four stop elements 120 are provided, the rotation axes A of which form the four corners of a rectangle.

Rotation axis A of each stop element is defined, in the embodiment depicted, by a securing element, embodied here as a threaded bolt 125, that simultaneously serves for rotatable mounting and for non-rotatable securing of its stop element on the retainer. Loosening threaded bolt 125 makes the associated stop element operational, and it can be adjusted against a sample carrier received in recess 110. Threaded bolt 125 can then be tightened so as thereby to secure the associated stop element substantially nonrotatably on the retainer.

Each of stop elements 120 comprises here a number of flat stop surfaces 121 that in the present case form a polyhedron. Without limitation, a cylindrical enveloping surface can likewise be provided as a stop surface.

Figure 2:
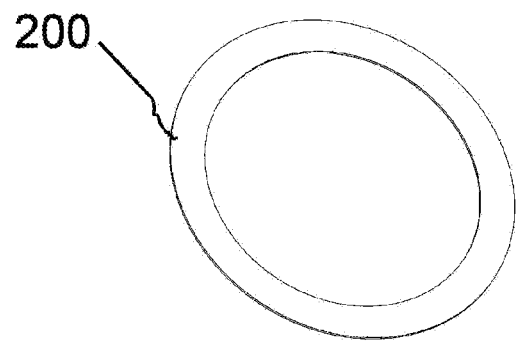
FIG. 2 shows an annular spacing element that can be placed into the retainer according to FIG. 1.
Figure 3:
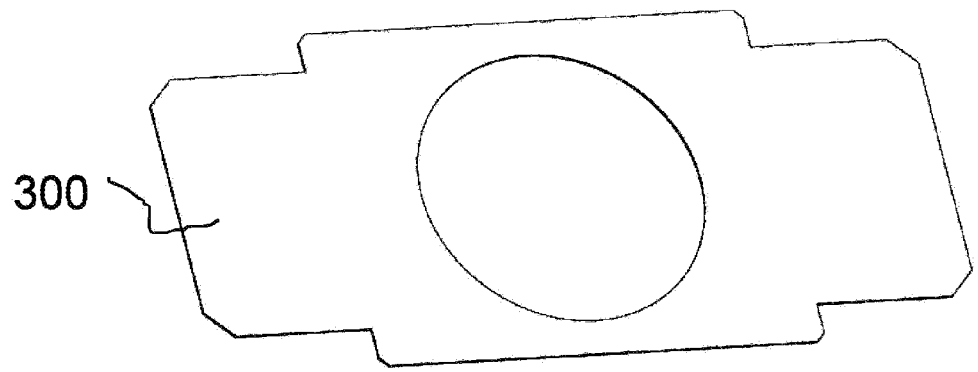
FIG. 3 shows a cruciform spacing element that can be placed into the retainer according to FIG. 1.

Retainer 100 furthermore possesses four spring elements, embodied here as leaf springs 130, that can press a sample carrier received in recess 110, and/or a spacing element (see FIGS. 2, 3), in the Z direction onto retainer 100 and thereby secure it. Leaf springs 130 are likewise each mounted on retainer 100 rotatably around a rotation axis B. Rotation axes A and B here all extend parallel to one another.

Embodied in recess 110 are two spacing element recesses 112, 113, that are delimited by steps inside recess 110. One step delimits an annular spacing element recess 113 that is embodied and provided for the reception of annular spacing elements 200 (see FIG. 2). Another step delimits a cruciform spacing element recess 112 that is embodied and provided for the reception of cruciform spacing elements 300 (see FIG. 3). The spacing elements serve to allow sample carriers of different heights (Z direction) to be identically oriented. This allows for conserving a focus plane.

Retainer 100 comprises a lateral access 114 that is embodied here as a continuous conduit 114. Through the access, for example, supply lines (sensors, energy supply, etc.) can be guided to the retained sample carrier.

Figure 4:
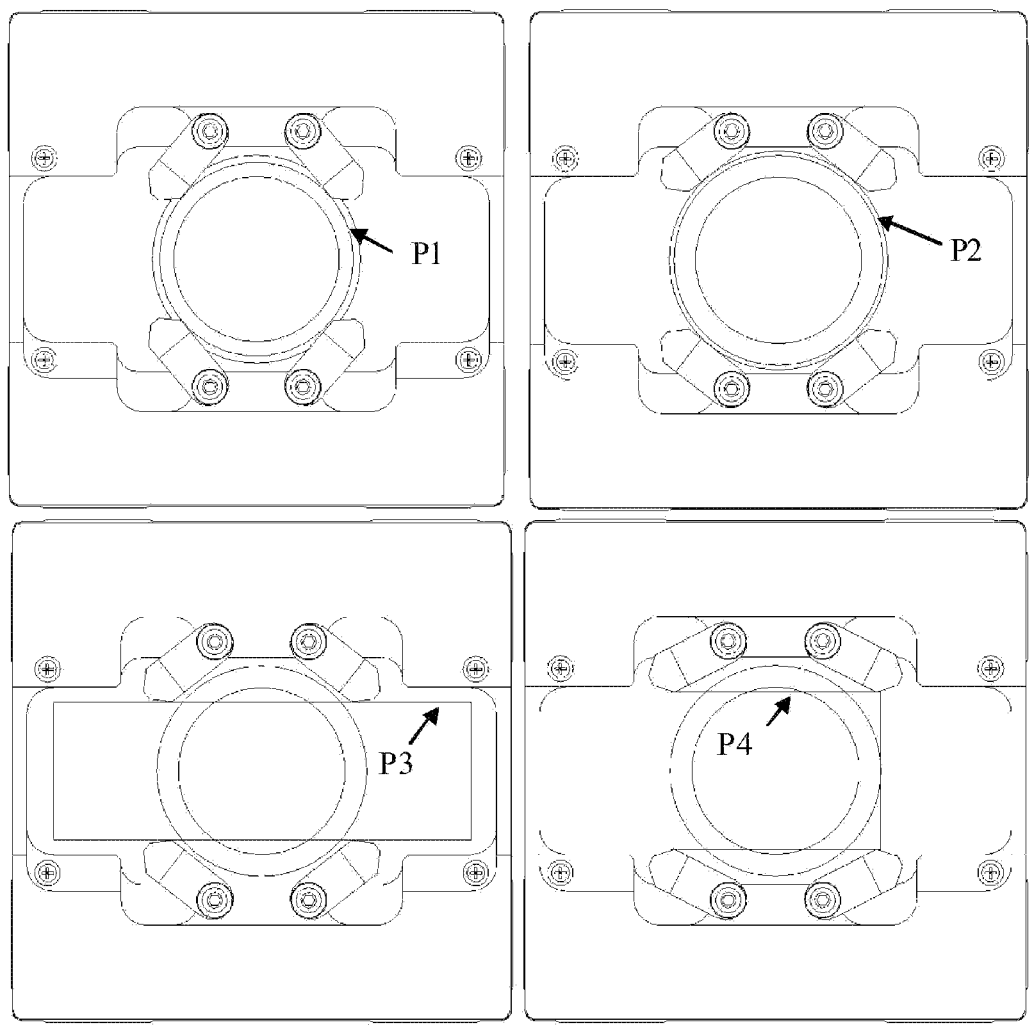
FIG. 4 is a plan view of the retainer according to FIG. 1 with four different retained sample carriers.

Lastly, FIG. 4 is a plan view depicting the manner in which four sample carriers P1 to P4 of different shapes and sizes are retained by retainer 100, the leaf springs having been omitted for reasons of clarity. For this, the four stop elements 120 are each adjusted against the respective sample carriers P1 to P4; sample carriers P1 and P2 are round (e.g. Petri dishes, round specimen carriers), and sample carriers P3 and P4 are rectangular (e.g. microtiter plates, rectangular specimen carriers).

Figure 5:
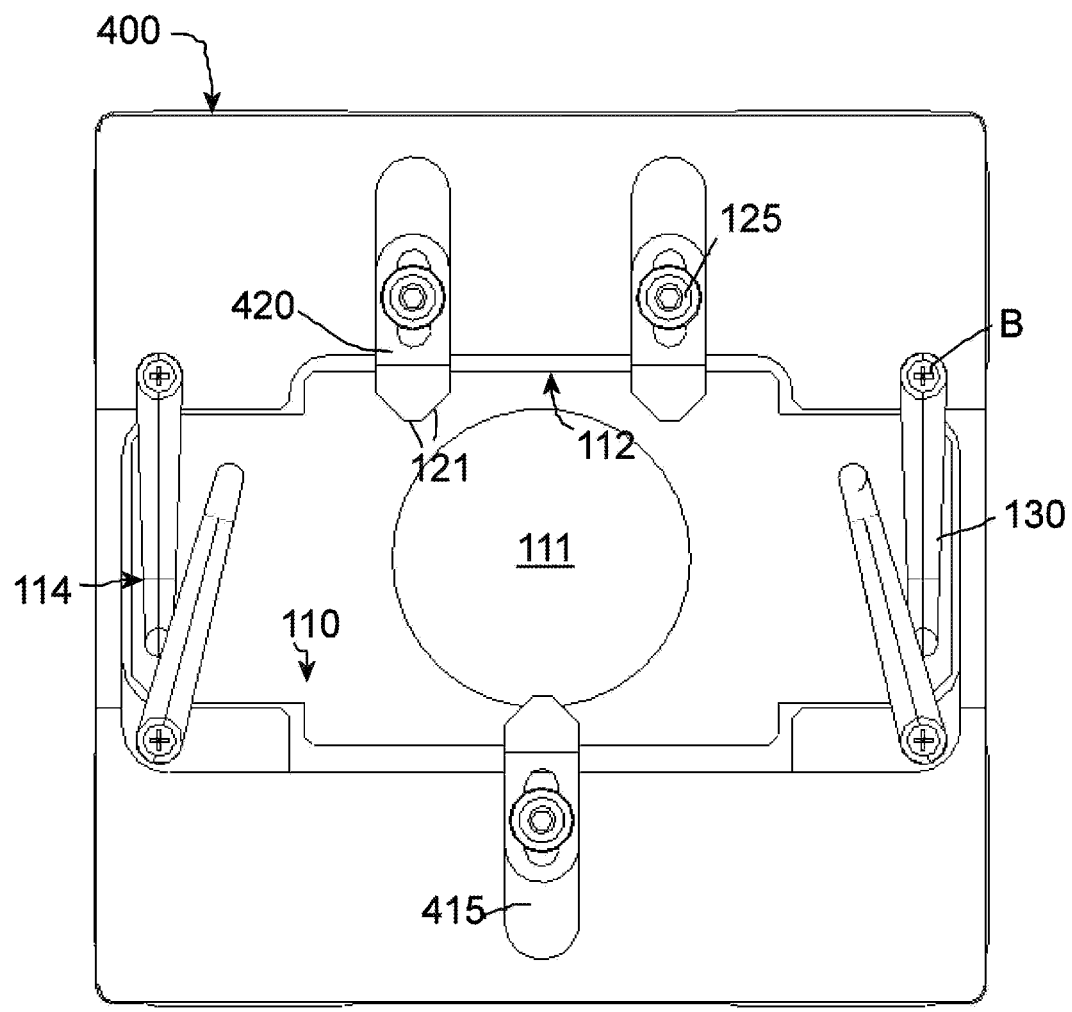
FIG. 5 is a plan view of a second embodiment of a sample carrier retainer according to an aspect of the present invention.

In FIG. 5, a second embodiment of a sample carrier retainer according to an aspect of the present invention is depicted in a plan view and labeled 400. Retainer 400 differs from retainer 100 in terms of the nature of the movable stop elements. Regarding the remaining elements, reference is made to the description of FIG. 1.

Retainer 400 here possesses three stop elements 420, each slidably mounted. Each stop element 420 can be secured immovably on the retainer by means of a securing element 125 embodied as a screw. Securing element 125 simultaneously constitutes, together with an elongated hole in the slidably mounted stop element, a guide for the stop element. A recess 415 is provided as a further guide in the retainer for each stop element.

In an embodiment depicted, three stop elements 420 are provided, the securing elements 125 of which form the three corners of an equilateral triangle.

The invention is not to be limited to the specific embodiments disclosed, and modifications and other embodiments are intended to be included within the scope of the invention.

PARTS LIST

100 Retainer
110 Recess
111 Opening
112 Cruciform spacing element recess
113 Annular spacing element recess
114 Access
120 Movable (rotatable) stop element
121 Stop surfaces
125 Threaded bolt
130 Leaf spring
200 Annular spacing element
300 Cruciform spacing element
A Rotation axis of stop element
B Rotation axis of leaf spring
P1-P4 Sample carriers
400 Retainer
420 Movable (slidable) stop element
415 Guide recess

What is claimed is:

1. A retainer for sample carriers of different shapes and sizes, and for arrangement in a microscope, the retainer comprising:
    a retaining plane configured to receive a sample carrier to be retained;
    at least three respectively movably mounted stop elements, each of the at least three stop elements including at least one stop surface configured to be adjusted, by movement of the stop element, against the sample carrier to be retained;

at least three securing elements, each of the at least three securing elements being associated with a respective stop element of the at least three stop elements;

wherein each of the at least three securing elements are configured to immovably secure the associated stop element on the retainer, such that each of the at least three securing elements are conveyable into a first position in which the associated stop element is movable, and such that each of the at least three securing elements are conveyable into a second position in which the associated stop element is secured immovably on the retainer.

2. The retainer according to claim 1, wherein at least one of the at least three respectively movably mounted stop elements-are rotatably mounted around a stop element rotation axis.

3. The retainer according to claim 2, wherein at least one of the at least three securing elements forms the stop element rotation axis for an associated stop element.

4. The retainer according to claim 2, wherein at least one of the stop element rotation axes is perpendicular to the retaining plane.

5. The retainer according to claim 1, wherein at least one of the at least three stop elements is slidably mounted.

6. The retainer according to claim 1, wherein at least one of the at least three securing elements is connected via a screw connection to the retainer.

7. The retainer according to claim 1, wherein the at least three stop elements are arranged such that they form corners of a polygon corresponding to the number of displaceable stop elements.

8. The retainer according to claim 1, wherein the at least three stop elements are exactly three stop elements that are arranged to form corners of an isosceles or an equilateral triangle.

9. The retainer according to claim 1, wherein the at least three stop elements are exactly four stop elements that are arranged to form the corners of a rectangle.

10. The retainer according to claim 1, further comprising at least one spring element configured to exert a force perpendicular to the retaining plane.

11. The retainer according to claim 10, wherein the at least one spring element is mounted rotatably about a spring element rotation axis.

12. The retainer according to claim 11, wherein the spring element rotation axis is parallel to the stop element rotation axis.

13. The retainer according to claim 1, wherein the retaining plane is defined by a recess into which the sample carrier to be retained is to be placed.

14. The retainer according to claim 1, further comprising at least one spacing element recess that is configured to receive spacing elements.

15. The retainer according to claim 1, further comprising at least one spacing element recess that is configured to receive spacing elements;

wherein the retaining plane is defined by a recess into which the sample carrier to be retained is to be placed;

wherein the at least one spacing element recess is arranged within the recess.

16. The retainer according claim 1, further comprising at least one spacing element, removable in nondestructive fashion, arranged on the retaining plane.

17. The retainer according to claim 1, further comprising an opening through the retaining plane, around a center point or centroid of the at least three stop elements.

18. The retainer according to claim 1, further comprising a lateral access to the retaining plane.

* * * * *